United States Patent [19]

Shiraki et al.

[11] Patent Number: 4,804,873
[45] Date of Patent: Feb. 14, 1989

[54] UNIDIRECTIONAL BRUSHLESS MOTOR

[75] Inventors: Manabu Shiraki, Yamato; Osami Miyao, Sagamihara, both of Japan

[73] Assignee: Shicoh Engineering Co., Ltd., Kanagawa, Japan

[21] Appl. No.: 83,007

[22] Filed: Aug. 6, 1987

Related U.S. Application Data

[63] Continuation of Ser. No. 921,465, Oct. 22, 1986, abandoned.

[30] Foreign Application Priority Data

Nov. 7, 1985 [JP] Japan .......................... 60-171259[U]

[51] Int. Cl.$^4$ ..................... H02K 21/08; H02K 11/00; H02K 29/08
[52] U.S. Cl. .................................. 310/67 R; 310/254; 318/254
[58] Field of Search .............. 310/41, 46, 67 R, 68 B, 310/68 R, 156, 162, 186, 268, 269, 254; 318/254

[56] References Cited

U.S. PATENT DOCUMENTS

| | | | |
|---|---|---|---|
| 4,115,715 | 9/1978 | Müller | 310/67 R |
| 4,404,484 | 9/1983 | Gillott | 310/41 |
| 4,620,139 | 10/1986 | Egami et al. | 310/68 R |
| 4,733,119 | 3/1988 | Shiraki et al. | 310/68 R |

FOREIGN PATENT DOCUMENTS

| | | |
|---|---|---|
| 2315190 | 6/1976 | France . |
| 2497571 | 1/1981 | France . |

OTHER PUBLICATIONS

Patent Abstracts of Japan, vol. 9, No. 234 (E-344) [1957], Sep. 20, 1985 & JP-A-60 87 650 (Yoshiteru Takahashi) 05-17-1985.
Patent Abstracts of Japan, vol. 9, No. 266 (E-352) [1989], Oct. 13, 1985 & JP-A-60 113 646 (Yoshiteru Takahashi) 06-20-1985.
European Search Report EP 86 11 4618 & Annex to the European Search Report.

*Primary Examiner*—Patrick R. Salce
*Assistant Examiner*—D. L. Rebsch
*Attorney, Agent, or Firm*—Wegner & Bretschneider

[57] ABSTRACT

An inexpensive brushless motor including a single position detecting element can start itself and can rotate smoothly with good efficiency and reduced noise. The motor comprises a stator core having T-shaped radial stator poles with driving coils wound on all or some of the stator poles. A field magnet having driving alternate N and S magnetic pole zones is mounted for rotation in an opposing relationship to circumferential faces of the stator poles of the stator core. A cogging generating magnetic plate is located in an opposing relationship below the field magnet and has a cutaway portion formed therein which has a suitable angular width such that the magnetic plate may generate a cogging, to move the field magnet by attraction therebetween to a position other than any dead point, and from which the field magnet can start itself. The single position-detecting element is located such that it may detect no dead point upon starting of the motor.

7 Claims, 4 Drawing Sheets

PRIOR ART
FIG. 1
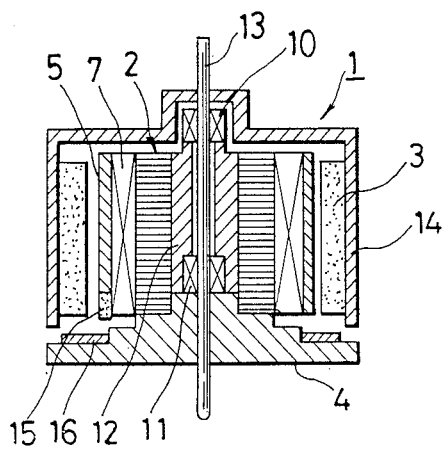
PRIOR ART
FIG. 2
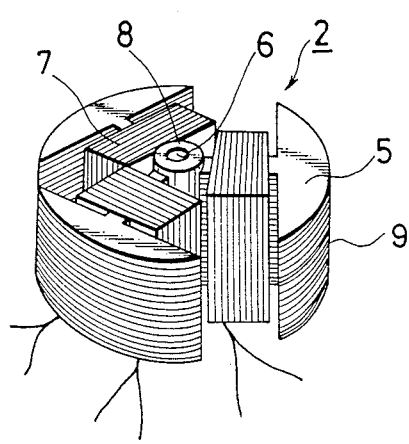
PRIOR ART
FIG. 3
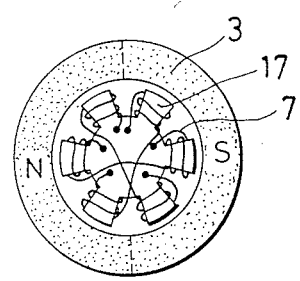
PRIOR ART
FIG. 4
PRIOR ART
FIG. 5
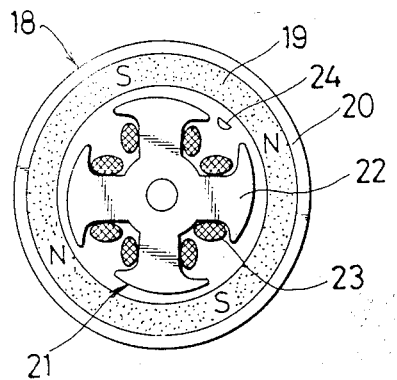

UNIDIRECTIONAL BRUSHLESS MOTOR

This application is a continuation of application Ser. No. 921,465, filed Oct. 22, 1986, which is now abandoned.

BACKGROUND OF THE INVENTION

1. Field of the Invention

This invention relates to a brushless motor, and more particularly to a brushless motor which can start itself with a single position detecting element.

2. Description of the Prior Art

A 2-pole field magnet, 3-stator pole, 3-coil, 3-phase small dc brushless motor as shown in FIG. 1 is already known as an inexpensive, efficient brushless motor. Brushless motors of this type are mostly used for commutator motors because they are more inexpensive and efficient than 2-phase, 4-coil small dc motors. The structure of such 2-pole, 3-coil, 3-phase small dc motors will be first described with reference to FIGS. 1 to 3. The brushless motor generally denoted at 1 includes a stator core 2 as seen in FIG. 2 which constitutes a stationary section of the motor 1, and a 2-pole field magnet 3 as seen in FIG. 3 which is mounted for rotation around the stator core 2. Thus, the brushless motor 1 includes no brush or commutator.

The stator core 2 is securely mounted on a fixed base 4 and has 3 substantially T-shaped stator poles 5 as shown in FIG. 2. The 3 stator poles 5 are connected in a circumferentially equidistantly spaced relationship to a central annular portion of the stator core 2 and extend radially outwardly therefrom. The central annular portion of the stator core 2 has a center bore 6 formed therein for receiving a rotary shaft therein. A coil 7 is wound on each of the T-shaped stator poles 5 of the stator core 2. The stator poles 5 each have a radial or stem portion 8 on which a driving coil 7 is wound and an outer circumferential portion 9 which extends in opposite circumferential directions from an outer end of the stator pole 5. The circumferential portions 9 of the stator poles 5 have an angular width smaller than 180 degrees, for example, an angular width of 90 degrees. In this arrangement, antitorque appears and hence the efficiency is low, but considerable turning torque can be obtained.

A pair of bearings 10, 11 are secured in the center bore 6 of the stator core 2 by means of a bearing support member 12. A rotary shaft 13 is supported for rotation by the bearings 10, 11 and has a cup-shaped rotor yoke 14 secured thereto. The annular 2-pole field magnet 3 is securely mounted on an inner circumferential face of the cup-shaped rotor yoke 14 in an opposing relationship to the stator core 2 and for rotation around the stator core 2. The field magnet 3 is magnetized to form a pair of N (north) and S (south) magnetic poles which have an angular width of 180 degrees as illustratively shown in FIG. 3. 2 or 3 position detecting elements 15 such as Hall effect elements or Hall ICs (integrated circuits) are located at suitable positions on the outer periphery of the stator core 2 for detecting an N or S pole of the field magnet 3 in order that the driving coils 7 may be energized successively by an electric current flow in an appropriate direction to rotate the rotor in a predetermined direction. A printed circuit board 16 is securely mounted on the base 4.

The small dc brushless motor 1 having such a construction as described above has a drawback that a high cogging torque appears and will prevent smooth rotation of the rotor when the rotor is rotated from a stable position to another stable position passing an intermediate unstable position by energization of the coils. Accordingly, during rotation of the brushless motor 1, disagreeable high noises are normally produced. Therefore, the brushless motor 1 is not suitable for a brushless fan motor for use with a business machine or an automobile in which it must be rotated with minimum noise, and great efforts have been made to minimize or eliminate disagreeable turning noises of brushless motors. However, this is very difficult to accomplish due to properties of brushless motors as rotary motors. Thus, a brushless motor as shown in FIG. 4 has been proposed to eliminate this problem. The motor shown includes a stator core having a double number of, that is, 6, stator poles 17 with coils 7 individually wound thereon. However, this also has the drawback that the efficiency is not improved significantly while the cost rises. The dc brushless motors of the constructions described above have the further drawback that they cannot be produced at a low cost because they necessitate 2 or 3 (sometimes, 4 or more) expensive position-detecting elements and hence soldering operations must be done individually for such position-detecting elements.

Particularly in small motors, it is necessary to raise the efficiency without increasing the cost or else to reduce the price with the efficiency maintained, and hence the price cannot be raised so high. Accordingly, in such small rotary motors which include a small number of components in construction and are simple in principle, a significant difference or merit in efficiency may be achieved from a little improvement thereof. Therefore, various inventions and proposals have been made so far, and hence a large number of applications for patents have been made.

Thus, a 4-pole, 3-stator pole, 3-coil, 3-phase brushless motor wherein grooves are formed on stator poles to reduce a cogging, to attain smooth rotation of the motor, is proposed in a Japanese laid-open patent No. 54-57608. This brushless motor, however, has a drawback that it is very expensive even though it is advantageous in improved performance. A 2-pole, 3-stator pole, 3-coil brushless motor wherein grooves are formed on stator poles is also disclosed in another Japanese laid-open patent No. 53-147216. However, this motor also has a drawback that it is expensive. It is another drawback of the motor that the efficiency cannot be improved very much due to generation of opposing torque.

3-stator pole, 3-coil, 3-phase brushless motors are considered superior to 2-phase brushless motors because a higher turning torque can be obtained with a higher efficiency. However, because they produce disagreeable high turning noises during rotation at high speed, increasing interest has been taken in 4-stator pole, 4-coil, 2-phase small dc brushless motors with smooth rotation. These are more suitable for applications which require minimized noise, such as fan motors, but are less efficient. Further, such 4-stator pole, 4-coil, 2-phase small dc brushless motors also have a drawback in that they require at least two position detecting elements and are therefore expensive.

A typical brushless motor which is designed to require only one position-detecting element in order to eliminate the drawbacks described above is a 4-stator pole, 4-coil, 2-phase small dc brushless motor. Now, a brushless motor of the type just mentioned will be described with reference to FIG. 5.

The 2-phase small dc brushless motor generally denoted at 18 is constituted as an outer rotor motor and includes a field magnet 19 having 4 driving alternate N and S magnetic poles and securely mounted on a rotor yoke 20 for rotation around a stator core 21. The stator core 21 has 4 T-shaped stator poles 22 formed in a circumferentially equidistantly spaced relationship thereon, and a driving coil 23 is wound on each of the T-shaped stator poles 22. The driving coils 23 are wound in bifilar windings such that two opposing ones of the armature coils 12 for a first phase may be energized with a polarity opposite to the polarity of the other opposing armature coils 12 for a second phase. The brushless motor 18 further includes a Hall IC 24 as a position-detecting element.

The brushless motor 18 of FIG. 5 is characterized in that the stator poles 22 of the stator core 21 are each sloped or slanted with respect to the rotor such that the dimension of the air gap gradually increases toward a clockwise direction in order to allow self-starting of the motor with the single position-detecting element 24. The brushless motor is thus relatively simple in construction, but it has a drawback that, because the dimension of the air gap is relatively large, the efficiency of the motor is low.

Another typical brushless motor is disclosed in U.S. Pat. No. 3,299,635 and is shown in FIG. 6. The single-phase brushless motor generally denoted at 30 in FIG. 6 is constituted as an inner rotor motor and includes a single detecting element and a stator core having auxiliary stator poles. A stator armature core 25 has 4 radially extending main stator poles 26 formed in a circumferentially equidistantly spaced relationship, 4 driving coils 28 wound on the main stator poles 26, and 4 smaller auxiliary stator poles 27 formed between the main stator poles 26. A field magnet 29 is magnetized to have a pair of opposing N pole zones, S pole zones and O pole (non-magnetized) zones successively formed thereon. Such a 2-phase small dc brushless motor 30 as shown in FIG. 6 is surely useful because it can start itself with a single position-detecting element, but due to the presence of non-magnetized zones, it has drawbacks that torque ripples are so high that smooth rotation cannot be attained and that it is complicated in construction, expensive and inefficient.

A 2-phase small dc brushless motor which eliminates such drawbacks of the motors of FIGS. 5 and 6 as described above is shown in FIGS. 7(a) and 7(b). The brushless motor shown in FIGS. 7(a) and 7(b) is constituted as an outer rotor motor wherein a field magnet 31 as shown in FIG. 7(a) rotates around a stator core 32 as shown in FIG. 7(b).

Referring to FIG. 7(a), the field magnet 31 has 4 driving alternate N and S magnetic pole zones 31a formed by magnetization in a circumferentially equidistantly spaced relationship from each other and 8 auxiliary alternate N and S magnetic pole zones 31b also formed by magnetization in a circumferentially equidistantly spaced relationship from each other. Thus, the ratio a:b in width between the driving magnetic pole zones 31a and the auxiliary magnetic pole zones 31b is 2:1 with each of the 4 driving magnetic pole zones 31a overlapping with two of the 8 auxiliary magnetic pole zones 31b.

Referring now to FIG. 7(b), the stator core 32 has 4 main stator poles 33 and 4 auxiliary stator poles 34 located between the stator poles 33 as in the brushless motor 30 shown in FIG. 6 (while there is a difference in that the motor 30 of FIG. 6 is constituted as an inner rotor motor and the motor of FIGS. 7(a) and 7(b) is constituted as an outer rotor motor). Armature coils 35 are wound only on the main stator poles 33 and are connected into two phase windings such that each two opposing ones thereof, which are located at symmetrical positions spaced by an angle of 180 degrees relative to the center of the motor, are connected in series so as to provide the same polarity to the associated main stator poles 33.

A Hall effect element is provided at a location not shown for detecting the position of the rotor in order that the field current of the driving coils 35 is switched by means of a transistor in response to a relative position of the field magnet 31 to the stator core 32 to obtain a torque in a predetermined fixed direction.

The brushless motor having such a construction as described above thus eliminates dead points by the combination of the composite field magnet 31 and the auxiliary stator poles 34 of the stator core 32 to allow self-starting of the motor with a single position-detecting element (Hall effect element). Meanwhile, the torque is generated by the composition of the 4 driving magnetic pole zones 31a and the 8 auxiliary magnetic pole zones 31b.

The brushless motor having such a construction as described above necessitates only one position-detecting element and has a reduced number of circuit components and is smaller in size if it is driven in half-waves. Thus, the single-phase brushless motor of the type is effective in practical use.

However, the brushless motor which is known as such a useful motor has a drawback that it is complicated in construction and difficult to produce and besides it is expensive because of the presence of the auxiliary stator poles and because a composite field magnet must be involved. Further, due to the presence of the auxiliary stator poles, it is difficult to wind a driving coil on a main pole 33 and hence it cannot be readily mass-produced. In addition, the efficiency is low due to anti-torque which is caused by the main stator poles 33 which have an angular width smaller than 90 degrees while the N and S magnetic pole zones are magnetized with an angular width of 90 degrees as the brushless motor has 4 driving magnetic poles 31a for generating a main torque (however, the efficiency is naturally higher than that of conventional brushless motors).

Anyway, conventional single-phase energized brushless motors (while such motors are sometimes called 2-phase motors because they have an arrangement of driving coils for two phases, it is accurate to call them single-phase motors because they are energized for a single phase in principle) which are designed to allow self-starting with a single position-detecting element generally have a drawback that the structure is complicated and hence their production cost is high.

SUMMARY OF THE INVENTION

It is an object of the present invention to provide a brushless motor which can rotate smoothly without producing disagreeable turning noises and can start itself with a single position detecting element.

It is another object of the invention to provide a brushless motor which can start itself with a single position detecting element and wherein a high turning torque can be obtained with a high efficiency.

It is a further object of the invention to provide a single-phase small dc brushless motor which can start itself with a single position detecting element and is simplified in construction to facilitate mass-production of such brushless motors at a low cost.

In order to attain the objects, according to the present invention, there is provided a brushless motor, comprising: a stator core having a plurality of radially extending T-shaped stator poles; a plurality of driving coils wound on all or selected ones of said stator poles of said stator core; a field magnet mounted for rotation opposite the circumferential faces of said stator poles with a radial space left between said field magnet and said circumferential faces, said field magnet having a plurality of driving alternate north and south magnetic pole zones; a cogging generating magnetic plate mounted at a stator position opposite one face of said field magnet with an axial space left between said cogging generating magnetic plate and said field magnet, said cogging generating magnetic plate defining at least one cutaway portion of an angular width such that said cogging generating magnetic plate may generate a cogging to move said field magnet by attraction therebetween to a position which is other than any dead point so as to allow said field magnet to start itself; and a single position-detecting element provided such that it may not detect any dead point upon starting of said motor.

BRIEF DESCRIPTION OF THE DRAWINGS

FIG. 1 is a vertical sectional view of a conventional 3-phase small dc brushless motor having a 2-pole field magnet, 3 stator poles and 3 coils;

FIG. 2 is perspective view, in a somewhat enlarged scale, of a stator core of the motor of FIG. 1;

FIG. 3 is a perspective view, in a somewhat reduced scale, of the 2-pole field magnet of FIG. 1;

FIG. 4 is a schematic plan view of a field magnet and a stator core of a conventional 3-phase small dc brushless motor having a 2-pole field magnet, 6 stator poles and 6 coils;

FIG. 5 is a schematic horizontal sectional view of a conventional 2-phase small dc brushless motor having a 4-pole field magnet, 4 stator poles and 4 coils;

DESCRIPTION OF THE PREFERRED EMBODIMENTS

Figure 6:
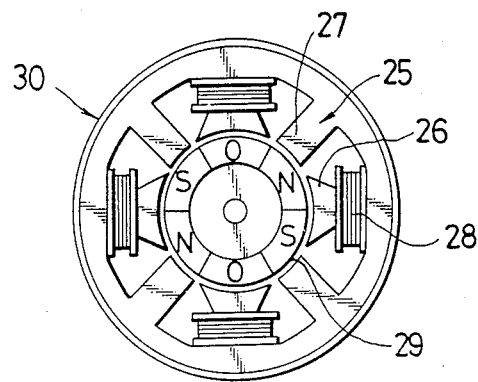
FIG. 6 is a schematic illustration of another conventional 2-phase small dc brushless motor having 4 coils.
Figure 7A:
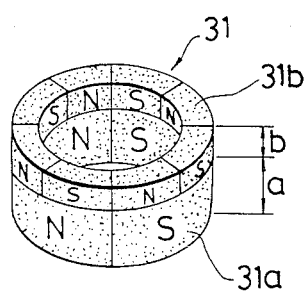
FIGS. 7(a) and 7(b) are schematic illustrations of a field magnet and a stator core, respectively, of a further conventional 2-phase small dc brushless motor having 4 coils.
Figure 7B:
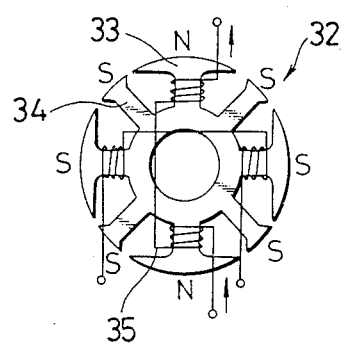
Figure 8:
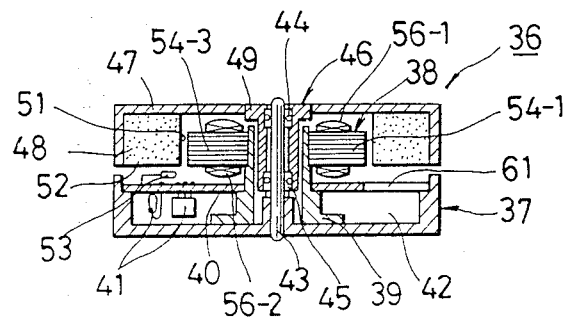
FIG. 8 is a vertical sectional view of a small dc brushless motor having a 6-pole field magnet, 4 stator poles, 2 coils and a single position-detecting element according to a first embodiment of the present invention.
Figure 10:
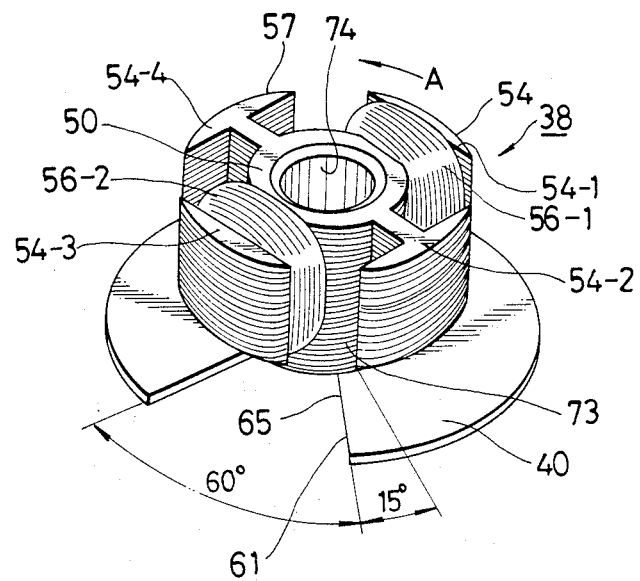
FIG. 10 is a perspective view, in a somewhat enlarged scale, of the stator core of the motor of FIG. 8.

Referring first to FIG. 8, there is illustrated a small dc brushless motor having a 6-pole field magnet, 4 stator poles, 2 coils and a single position-detecting element according to an embodiment of the present invention. The brushless motor generally denoted at 36 is constituted as an outer rotor motor and includes a flattened stationary cup member 37, a stator core 38 and a stator core support 39 securely mounted on the cup member 37 and supporting the stator core 38 thereon. A cogging generating magnetic circuit board 40 is securely mounted on the cup member 37 and the support 39 and has formed therein a cutaway portion 61 as seen in FIG. 10 which will be hereinafter described in detail. An accommodating spacing 42 is formed between an inner face of the cup member 37 and the cogging generating magnetic circuit board 40, and electric parts 41 (where an integrated circuit is employed, the number of such electric parts 41 may be small as seen in FIG. 8) which constitute an energization controlling circuit are located on the cogging generating magnetic circuit board 40 within the accommodating spacing 42.

A fixed shaft 43 is securely mounted on the stationary cup member 37, and a rotor 46 is supported for rotation around the fixed shaft 43 by means of a pair of bearings 44, 45. The rotor 46 includes a flattened cup-shaped rotor yoke 47 securely fixed to a connecting member 49 to which the bearings 44, 45 are secured. A cylindrical field magnet 48 is securely mounted on an inner circumferential face of the rotor yoke 47 such that it may rotate around and in an opposing relationship to an outer periphery of the stator core 38. The field magnet 48 has 6 driving N and S magnetic pole zones 51 which are arranged in an alternating relationship along a circumferential direction of the field magnet 48. 6 position-detecting magnetic pole zones 52 similar to the driving magnetic pole zones 51 are also formed at a lower end of the field magnet 48 by a dual magnetizing means or the like. The position-detecting alternate N and S magnetic pole zones 52 are arranged in the same positional relationship with the driving N and S magnetic pole zones 51.

A position-detecting element 53 such as a Hall effect element, a Hall IC or a magnetic reluctance element is soldered to a position on the magnetic circuit board 40 opposite the position-detecting magnetic pole zones 52 of the field magnet 48.

Figure 9:
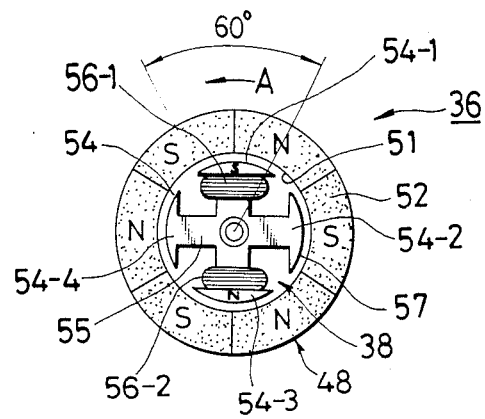
FIG. 9 is a schematic representation illustrating a relationship between the field magnet and a stator core of the motor of FIG. 8.

Referring now to FIG. 9, the driving N and S magnetic pole zones 51 and the position-detecting N and S magnetic pole zones 52 extend individually along the same circumferential ranges, and the 6-pole field magnet 48 having those magnetic pole zones 51, 52 is mounted for rotation around the stator core 38. Since the field magnet 48 has the 6 driving magnetic pole zones 51 and the 6 position-detecting magnetic pole zones 52, the N and S pole zones 51, 52 are each magnetized with an angular width of 60 degrees.

Meanwhile, referring also to FIG. 10, the stator core 38 may be composed of, for example, a stack of silicon steel plates with 4 T-shaped stator poles 54 extending radially from an inner annular portion 50 thereof and arranged in a circumferentially equidistantly spaced relationship. A center bore 74 is formed in an axial direction in the annular portion 50 of the stator core 38, and the connecting member 49 of the rotor 46 extends through the center bore 74 (see FIG. 8). A pair of driving coils 56-1, 56-2 are wound on radial stem portions 55 of the first and third ones 54-1, 54-3, respectively, of the 4 T-shaped stator poles 54-1, 54-2, 54-3 and 54-4. An outer circumferential portion 57 of each of the T-shaped stator poles 54 is disposed opposite the field magnet 48 and has an angular width substantially equal to the angular width of each of the magnetic pole zones of the field magnet 48, that is, 60 degrees because the field magnet 48 has the 6 driving magnetic pole zones 51. Such a construction of the stator core 38 as described just above will make a single-phase small dc brushless motor wherein a high torque can be obtained efficiently and without such a high antitorque as may appear in a conventional small dc brushless motor.

Referring to FIG. 10, the magnetic circuit board 40 has the cutaway portion 61 formed therein in order to allow the rotor 46 including the field magnet 48 to start itself from a position other than any dead point of the motor and rotate in a predetermined direction even if the motor includes only one position-detecting element 53. The magnetic circuit board 40 has dual functions as a stator yoke and a printed circuit board and may be replaced by a stator yoke and a separate printed circuit board. In the latter case, the cutaway portion 61 may be formed in the stator yoke. In this case, there is a higher degree of freedom in angular width of the cutaway portion than where the magnetic circuit board 40 is employed. On the other hand, installation may be more troublesome because the stator yoke and the printed circuit board must both be assembled. Whichever of the stator yoke and the printed circuit board is located above the other depends upon the design of the motor.

Figure 11:
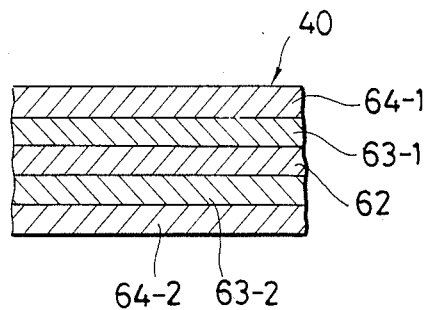
FIG. 11 is a schematic representation, in an enlarged scale, of a cogging generating magnetic circuit board.

Referring now to FIG. 11, there is an example of the magnetic circuit board 40 described above. The magnetic circuit board 40 is composed of a magnetic plate 62 such as an iron plate, insulator layers 63-1, 63-2 applied to opposite faces of the magnetic plate 62, and printed wiring patterns 64-1, 64-2 of a copper foil or the like formed on outer faces of the insulator layers 63-1, 63-2 by suitable means such as etching. The circuit board 40 of the construction described above is employed so that the position-detecting element 53 may be located on the one wiring pattern 64-1 and the electric parts 41 may be located on the other wiring pattern 64-2. Accordingly, if the electric parts 41 are located on the one wiring pattern 64-1, the other printed wiring pattern 64-2 and the insulator layer 63-2 on which the wiring pattern 64-2 is located can be omitted.

Now, the cutaway portion 61 of the magnetic circuit board 40 will be described in detail. The cutaway portion 61 of the magnetic circuit board 40 must necessarily be located in an opposing relationship to the position-detecting magnetic pole zones 52 of the field magnet 48 (whether or not the field magnet 48 has such position detecting magnetic pole zones 52 thereon) so as to generate a cogging torque so that the field magnet 48 may be stopped by attraction of the magnetic circuit board 40 at a position which is different than dead points and from which the field magnet 48 can start itself. The cutaway portion 61 conveniently has an angular width equal to or substantially equal to a value determined by a following expression (1)

$$n.T \leq \theta < P.T \ldots \quad (1)$$

where $\theta$ (where n is an integer equal to or greater than 1, and $\theta = n.T + a$, $a$ being an angular width greater than or equal to 0 and less than T) is an angular width of the cutaway portion 61, T is an angular width of each magnetic pole zone of the field magnet 48, and P is a number of magnetic pole zones of the field magnet 48. Since in the present embodiment the field magnet 48 has 6 magnetic poles and hence T and $\theta$ are each equal to 60 degrees in mechanical angle, the width $\theta$ of the cutaway portion 61 here is just or about 60, 120, 180 or 240 degrees in mechanical angle as calculated from the expression (1) above. Naturally, the shape of the cutaway portion 61 may be somewhat modified with reference to such angles as listed above without departing from the scope and spirit of the present invention. As the width $\theta$ of the cutaway portion 61 of the magnetic circuit board 40 (or else a stator yoke) increases, a greater number of such cogging generating circuit boards can be produced from a particular area of a stock material and hence a greater number of brushless motors can be produced at a lower cost. However, except where a stator yoke is involved and where an energization controlling circuit is constructed from an IC or ICs, the width $\theta$ of the cutaway portion 61 cannot be very great since such electric parts as denoted at 41 constituting an energization controlling circuit must be located on the magnetic circuit board 40. Therefore, according to the present embodiment, n=1 is selected in the expression (1) above and accordingly the angular width $\theta$ of the cutaway portion 61 of the magnetic circuit board 40 is 60 degrees in mechanical angle.

Location of the magnetic circuit board 40 (or a stator yoke) having the cutaway portion 61 therein relative to the stator poles 54 will be described below.

Referring to FIG. 9, the T-shaped stator poles 54-1 and 54-3 as well as 54-2 and 54-4 of the stator core 38 are formed at symmetrical positions relative to each other, that is, at positions spaced by an angle of 180 degrees from each other, with respect to the center of the motor 36. Thus, the motor 36 of the present embodiment is characterized in that, if the magnetic circuit board 40 lacks cutaway portion 61, when two opposing stator poles on which the armature coils 56-1, 56-2 are wound, that is, the stator poles 54-1, 54-3, oppose to a pair of opposing N and S magnetic pole zones of the field magnet 48 (that is, when the field magnet 48 is in a stable position), the remaining stator poles 54-2, 54-4 oppose dead points (boundaries between adjacent N and S magnetic pole zones of the field magnet 48). If instead the field magnet 48 has 4 poles, there is the possibility that all 4 stator poles 54-1 to 54-4 will oppose dead points so that the field magnet 48 may not start itself, but in the present embodiment, there is no such possibility. However, with this arrangement there is the possibility that the motor cannot start itself, that smooth rotation cannot be attained and that the efficiency may be low unless two position detecting elements are used (the motor must necessarily be a 2-phase motor).

In eliminating the possibility, a motor according to the present invention is necessarily designed to allow self-starting thereof with a single position-detecting element. To this end, the motor according to the present invention employs the magnetic circuit board (or stator yoke) 40 having cutaway portion 61 therein. By this means, even where an edge 65 of the magnetic circuit board 40 defining the cutaway portion 61 opposes a boundary between adjacent position-detecting N and S magnetic pole zones 52, that is, a dead point, a slight external force will cause the field magnet 48 to be moved to a stable position by attraction of the magnetic circuit board 40 by the adjacent position-detecting N or S magnetic pole zone 52 of the field magnet 48. Accordingly, the field magnet 48 will stop at a position other than any dead point and from which it can start itself upon starting of the motor 36. Therefore, if the position-detecting element 53 is so positioned that it can detect an N or S position-detecting magnetic pole zone 52 upon stopping of the field magnet 48, the motor 36 can start itself without fail.

It is to be noted that the use of a cogging generating magnetic member of the magnetic circuit board 40 or a stator yoke having a cutaway portion therein provides a low cost brushless motor which can start itself, using a printed circuit board and a stator yoke or a magnetic circuit board such as the board 40 which have been required in conventional brushless motors, without a specific expensive means as conventionally employed in a single-phase energized brushless motor for enabling self-starting of the motor.

Detailed description of the accurate location of magnetic circuit board 40 will appear hereinbelow.

It is also to be noted that driving coils are only wound on one pair of opposing T-shaped stator poles 54-1 and 54-3 of the stator core 38 and driving coils for the other pair of opposing T-shaped stator poles 54-2 and 54-4 are omitted to obtain a brushless motor at a reduced cost.

Referring again to FIG. 9, it can be seen that the driving coils 56-1, 56-2 are at positions from which they can start. Accordingly, if the driving coils 56-1, 56-2 are energized, a magnetomotive force for the S polarity is generated at the T-shaped stator pole 54-1 while a magnetomotive force for the N polarity is generated at the stator pole 54-3 located at a symmetrical position spaced by an angle of 180 degrees from the stator pole 54-1. Consequently, the field magnet 48 is rotated in a direction indicated by an arrow mark A.

Figure 12:
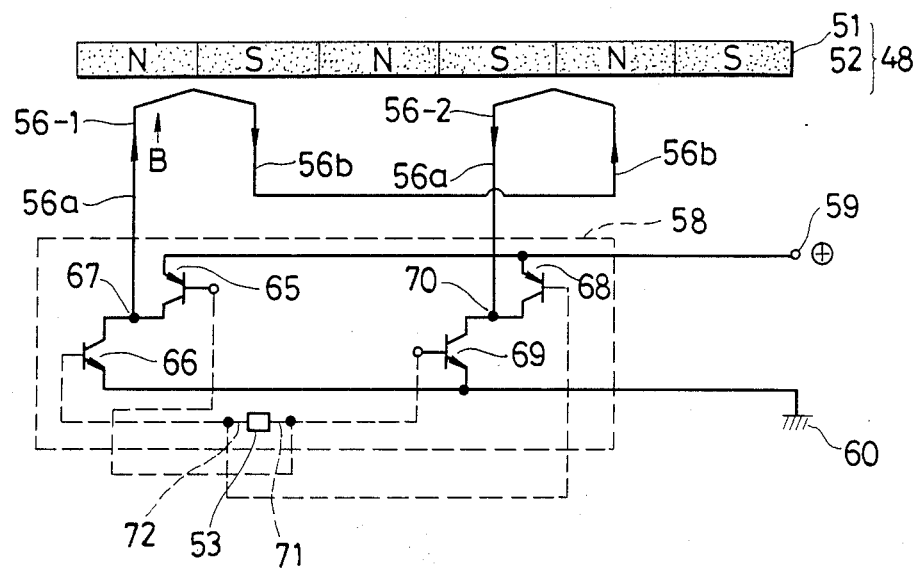
FIG. 12 is a developed view of the field magnet and armature coils of the motor of FIG. 8.

FIG. 12 is a developed view of the field magnet 48 and the driving coils 56-1, 56-2 wound on the stator poles 54-1, 54-3, respectively. Because the angular distance or width between magnetically active conductor portions 56a and 56b of the driving coils 56-1, 56-2 which contribute to generation of a torque is equal to the angular width of each driving magnetic pole zone 51 of the field magnet 48, that is, 60 degrees, as can be apparently seen from the developed view of FIG. 12, the driving coils 56-1, 56-2 will generate little counter torque and hence generate a high turning torque, making a turning motor of high efficiency. This is only attained by such construction of the T-shaped stator poles 54-1 and 54-3 that the circumferential portions 57 thereof have an angular width of 60 degrees while the driving coils 56-1, 56-2 do not actually include an angular width of 60 degrees.

An end of the driving coil 56-1 is connected to a junction point 67 between the collectors of transistors 65 and 66 in an energization controlling circuit 58 while an end of the other driving coil 56-2 is connected to a junction point 70 between the collectors of transistors 68 and 69. The other ends of the driving coils 56-1, 65-2 are connected in common. The emitters of the transistors 65 and 68 are connected in common to a psoitive power supply terminal 59. The emitters of the transistors 66 and 69 are connected in common to the ground 60. An output terminal 71 of the position detecting element 53 is connected to the bases of the transistors 65, 69 and the other output terminal 72 is connected to the bases of the transsitors 66, 68. The position detecting element 53 is located in an opposing relationship to the magnetically active conductor portion 56b of the driving coil 56-1.

In the position shown in FIG. 12, the position detecting element 53 detects an S position detecting magnetic pole 52 and thus delivers a signal via its output terminal 71. Consequently, the transistors 65, 69 are rendered conductive to energize the driving coils 56-1, 56-2 in a direction indicated by an appended arrow mark so that a turning torque in a predetermined direction may be generated. On the contrary, if the position detecting element 53 detects an N position detecting magnetic pole 52, the transistors 66, 68 are rendered conductive to energize the driving coils 56-1, 56-2 in the opposite direction so that a turning torque in the predetermined direction may be generated.

Now, accurate location of the magnetic circuit board 40 (or a stator yoke having a cutaway portion) for generating a cogging torque will be described. Referring to FIG. 10, it is assumed that the field magnet 48 rotates in a direction of an arrow mark A. Thus, the the magnetic circuit board 40 is located such that the end or edge 65 of the cutaway portion 61 thereof may be positioned in an opposing relationship to a position detecting magnetic pole zone 52 of the field magnet 48 and within a range from a position opposing a circumferential end 73 (or the other circumferential end) of the stator pole 54-2 (or any other stator pole 54-1, 54-3 or 54-4) to another position spaced backwardly by a distance substantially equal to one half of the full width of each magnetic pole zone (that is, equal to 30 degrees in mechanical angle) in the direction of rotation of the field magnet 48. More preferably, the magnetic circuit board 40 is located such that the end or edge 65 of the cutaway portion 61 thereof may be positioned at a position spaced backwardly by a distance equal to about one fourth of the angular width of each magnetic pole zone of the field magnet 48 from the end 73 of the stator pole 54-2 of the stator core 38.

In this arrangement, the field magnet 48 is normally stopped by the magnetic circuit board 40 having the cutaway portion 61 therein at a position from which it can start itself. Accordingly, the single-phase energized brushless motor including the single position detecting element 53 can start itself without fail and can continuously rotate smoothly.

It is to be noted that while in the embodiment described hereinabove the magnetic circuit board 40 has only one cutaway portion 61, it may otherwise have a plurality of such cutaway portions, and while the cutaway portion 61 is described as having an angular width equal to the angular width of each magnetic pole zone of the field magnet 48, it may be modified in any manner only if the brushless motor 36 can start itself.

It is also to be noted that while the brushless motor 36 is described as having 4 stator poles and 2 coils, it may be modified such that it involves a field magnet having 2, 4, 8 or a like number of magnetic pole zones and 2 or more stator poles or 1 or 3 or more driving coils.

What is claimed is:

1. A brushless DC motor, comprising:
a stator core having a plurality of radially extending T-shaped stator poles; a plurality of driving coils wound on all or selected ones of said stator poles of said stator core; a field magnet mounted for rotation opposite the circumferential faces of said stator poles with a radial space left between said field magnet and said circumferential faces, said field magnet having a plurality of driving alternate north and south magnetic pole zones; a cogging generating magetic plate mounted at a stator position opposite one face of said field magnet with an axial space left between said cogging generating magnetic plate and said field magnet, said cogging generating magnetic plate defining at least one cutaway portion of an angular width such that said cogging generating magnetic plate generates a cogging torque to move said field magnet by attraction therebetween to a position which is other than any dead point so as to allow said field magnet to start itself; and a single position-detecting element positioned so that a dead point is not detected upon starting of said motor.

2. A brushless DC motor according to claim 1, wherein said stator core has 4 circumferentially equidistantly spaced, radially extending T-shaped stator poles having an angular width substantially equal to the angular width of each magnetic pole zone of said field magnet with said driving coils wound on two of said stator poles which are located at same phase positions, and said field magnet has 6 driving alternate north and south magnetic pole zones located in an opposing relationship to said circumferential faces of said stator poles.

3. A brushless DC motor, comprising: a stator core having a plurality of radially extending T-shaped stator poles; a plurality of driving coils wound on all or selected ones of said stator poles of said stator core; a field magnet mounted for rotation opposite the circumferential faces of said stator poles with a radial space left between said field magnet and said circumferential faces, said field magnet having a plurality of driving alternate north and south magnetic pole zones; a cogging generating magnetic plate mounted at a stator position opposite one face of said field magnet with an axial space left between said cogging generating magnetic plate and said field magnet, said cogging generating magnetic plate defining at least one cutaway portion of an angular width such that said cogging generating magnetic plate may generate a cogging torque to move said field magnet by attraction therebetween to a position which is other than any dead point so as to allow said field magnet to start itself; and a single position-detecting element provided such that it may not detect any dead point upon starting of said motor, wherein cutaway portion of said cogging generating magnetic plate is defined by an arc of the cogging generating magnetic plate and two ends extending in radial directions of the cogging generating magnetic plate, and has an angular width equal to or substantially equal to $\theta$ which meets the following expression:

$$n.T \leq \theta < P.T$$

wherein $\theta$ is an opening angle of said cutaway portion, T is an angular width of each magnetic pole zone of said field magnet, n is an integer equal to or greater than 1, and P is a number of said magnetic pole zones of said field magnet, and wherein $n < P$, and $\theta = n.T + \alpha$, $\alpha$ being an angular width greater than or equal to 0 and less than T.

4. A brushless DC motor according to claim 1, wherein said cogging generating magnetic plate is located such that an end of said cutaway portion, said end extending in a radial direction of the cogging generating magnetic plate, is positioned within an angular range from a position opposite one of a pair of opposite circumferential ends of one of said stator poles of said stator core to a position spaced backwardly in the direction of rotation of said field magnet by a distance substantially equal to one half of the angular width of each magnetic pole zone of said field magnet.

5. A brushless DC motor according to claim 1, wherein said cogging generating magnetic plate is located such that an end of said cutaway portion, said end extending in a radial direction of the cogging magnetic plate, is positioned at a position spaced backwardly in the direction of rotation of said field magnet by a distance substantially equal to one fourth of the angular width of each magnetic pole zone of said field magnet from a position opposing one of a pair of opposite circumferential ends of one of said stator poles of said stator core.

6. A brushless DC motor according to claim 1, wherein said cogging generating magnetic plate is a magnetic circuit board including a magnetic plate, an insulator layer formed on said magnetic plate, and a printed wiring pattern formed on said insulator layer.

7. A brushless DC motor according to claim 6, wherein said magnetic circuit board has an electric part for an energization controlling circuit located thereon.

* * * * *